(12) United States Patent
Sutton, Jr. et al.

(10) Patent No.: US 11,224,300 B2
(45) Date of Patent: Jan. 18, 2022

(54) TRAVEL PILLOW WITH TRAY, CHARGER AND AUDIO FEATURES

(71) Applicants: Evan Sutton, Jr., Baltimore, MD (US);
Navea Z. Sutton, Baltimore, MD (US);
Zaiy'n N. Sutton, Baltimore, MD (US);
James Sabb, Jr., Baltimore, MD (US);
Tawanda K. Jeter, Aberdeen, MD (US)

(72) Inventors: Evan Sutton, Jr., Baltimore, MD (US);
Navea Z. Sutton, Baltimore, MD (US);
Zaiy'n N. Sutton, Baltimore, MD (US);
James Sabb, Jr., Baltimore, MD (US);
Tawanda K. Jeter, Aberdeen, MD (US)

( * ) Notice: Subject to any disclaimer, the term of this patent is extended or adjusted under 35 U.S.C. 154(b) by 220 days.

(21) Appl. No.: 16/416,046

(22) Filed: May 17, 2019

(65) Prior Publication Data
US 2019/0350389 A1    Nov. 21, 2019

Related U.S. Application Data

(60) Provisional application No. 62/673,201, filed on May 18, 2018.

(51) Int. Cl.
*A47G 9/10* (2006.01)
*A47C 16/00* (2006.01)
(Continued)

(52) U.S. Cl.
CPC ............ *A47G 9/1045* (2013.01); *A47C 16/00* (2013.01); *A47G 9/1081* (2013.01); *A63H 3/005* (2013.01);
(Continued)

(58) Field of Classification Search
CPC .. A47G 9/1045; A47G 9/1072; A47G 9/1081; A47G 2009/004; A47G 2009/006;
(Continued)

(56) References Cited

U.S. PATENT DOCUMENTS

| | | | | |
|---|---|---|---|---|
| 4,091,481 A | * | 5/1978 | Redman ............... | A47G 9/1045 206/83 |
| 4,116,310 A | * | 9/1978 | Shields ................. | A45C 15/00 224/576 |

(Continued)

*Primary Examiner* — David R Hare
(74) *Attorney, Agent, or Firm* — Miller Law Group, PLLC

(57) ABSTRACT

A travel pillow has an integral head portion that can be positioned behind the head of the traveler during use. The travel pillow incorporates a charging station in one of the forwardly extending arms and a stress reliever in the opposing arm. A Bluetooth™ audio system is included to pair with selected electronic devices to enhance the entertainment of the traveler. The pillow also includes a central opening, corresponding for positioning the traveler's neck, which receives a removable snack bowl and lid, held in place within the central opening by a releasable closure device on the opposing arms of the travel pillow. The lid can be formed to receive an electronic device, such as a cell phone or a digital device generating sound received by the audio system. The head portion can be formed as an animal head with the stress reliever being the tail of the animal.

15 Claims, 4 Drawing Sheets

(51) Int. Cl.
  *H02J 7/00*    (2006.01)
  *H04R 1/10*    (2006.01)
  *A63H 3/02*    (2006.01)
  *A47G 9/00*    (2006.01)
  *A63H 3/00*    (2006.01)

(52) U.S. Cl.
  CPC .............. *A63H 3/02* (2013.01); *H02J 7/0045* (2013.01); *H04R 1/1008* (2013.01); *H04R 1/1016* (2013.01); *H04R 1/1041* (2013.01); *A47G 2009/004* (2013.01); *A47G 2009/006* (2013.01); *H04R 2420/07* (2013.01)

(58) Field of Classification Search
  CPC    A63H 3/003; A63H 3/005; A63H 3/02; H02J 7/0045; A47C 16/00; H04R 2420/07
  See application file for complete search history.

(56) References Cited

U.S. PATENT DOCUMENTS

| | | | | |
|---|---|---|---|---|
| 4,638,884 A * | 1/1987 | Lee | ............... | H04R 5/023 181/141 |
| 5,313,678 A * | 5/1994 | Redewill | ............ | A47C 21/003 297/393 |
| 6,098,220 A * | 8/2000 | Momma | ............. | A47G 9/1009 5/636 |
| 6,560,802 B2 * | 5/2003 | Fujii | ................... | A47G 9/1045 368/10 |
| 6,644,475 B2 * | 11/2003 | Wilson, II | ............. | A45C 3/00 206/522 |
| 6,692,330 B1 * | 2/2004 | Kulick | ................... | A63H 3/28 434/308 |
| 6,941,601 B2 * | 9/2005 | DeBartolo | ........... | A47G 9/1045 220/737 |
| 7,227,965 B1 * | 6/2007 | Sutton | ................. | A47G 9/1045 381/124 |
| 7,461,421 B1 * | 12/2008 | Faircloth | ............. | A47G 9/1045 5/630 |
| 7,513,001 B1 | 4/2009 | Leach | | |
| 8,051,514 B2 * | 11/2011 | Yarmer | .................. | A47G 23/06 5/639 |
| 8,144,913 B1 * | 3/2012 | Myles, Jr. | ............. | H04R 5/023 381/374 |
| 8,468,628 B1 | 6/2013 | Cheng | | |
| 8,566,986 B1 * | 10/2013 | Chu | ..................... | A47G 9/1054 5/636 |
| 8,887,333 B2 * | 11/2014 | Cohen | ................. | A47C 27/081 5/639 |
| 9,526,360 B2 * | 12/2016 | Sternlight | ............... | A47G 9/10 |
| 10,201,240 B1 * | 2/2019 | Arrighi | ............ | A61G 13/121 |
| 2005/0150050 A1 * | 7/2005 | Wolf | ................... | A47C 27/086 5/636 |
| 2007/0253581 A1 * | 11/2007 | Sutton | ..................... | A63H 5/00 381/124 |
| 2009/0077750 A1 * | 3/2009 | Jarvis | .................... | D06C 23/04 5/639 |
| 2016/0066717 A1 * | 3/2016 | Schneider | ............ | G06F 3/0393 5/639 |
| 2017/0237272 A1 | 8/2017 | Corona | | |
| 2018/0078064 A1 * | 3/2018 | Washington | ....... | A47G 23/0608 |
| 2018/0146807 A1 * | 5/2018 | Silver | ................ | A47G 9/0253 |
| 2019/0246819 A1 * | 8/2019 | Lemoine | .............. | A63H 33/006 |

* cited by examiner

TRAVEL PILLOW WITH TRAY, CHARGER AND AUDIO FEATURES

CROSS-REFERENCE TO RELATED APPLICATIONS

This application claims domestic priority on U.S. Provisional Patent Application Ser. No. 62/673,201, filed on May 18, 2018, the content of which is incorporated herein by reference.

FIELD OF THE INVENTION

This invention relates generally to travel pillows used by travelers to rest their head, particularly when traveling on airplanes, and, more particularly, to a portable travel pillow that simultaneously allows the traveler to rest comfortably while providing access to various features that enhance the traveling experience.

BACKGROUND OF THE INVENTION

Many people travel long distances via airplanes for both work and leisure, spending extended periods of time in a mostly uncomfortable seat. Many of these travelers have mobile devices that are frequently operated to provide entertainment or a work function, such as with a laptop or electronic tablet. Currently, most airplanes to not provide charging stations for access by the traveler to keep their electronic devices charged and operable. Accordingly, it would be desirable to provide a capability of charging the electronic devices by using the travel pillow while providing a comfortable resting position for the duration of the ride.

Entertaining the resting traveler is also a desirable function for which airlines provide movies with earphones to permit the passengers to be occupied with an entertaining function. Yet, a limited selection of movies is made available to the travelers, some or all of which the travelers may not want to watch. Some experienced travelers bring with them digital recordings and electronic players that provide a more desirable selection of entertainment. Such electronic devices may need charging to maintain operation, but also such electronic devices can be cumbersome to hold for convenient operation and may have difficult to operate audio devices, or at least difficult to operate in conjunction with a travel pillow.

In U.S. Pat. No. 7,513,001, granted on Apr. 7, 2009, to Jamie S. Leach, a multi-purpose pillow is disclosed that has a pocket formed therein to hold various articles, including ear buds to provide convenient access to the ear buds for deployment when the multi-purpose pillow is being utilized. A pillow is disclosed in U.S. Pat. No. 8,468,628, granted to Tom Kwok-Yung Cheng on Jun. 25, 2013, to have a central cavity for the placement of the user's face. The pillow includes an insert at one end thereof for the placement of a battery operated fan mechanism that is operable to blow a selected scent into the cavity for inhalation by the user when the user's face is placed into the central opening. Openings are formed laterally on opposing sides of the central opening to provide a source of air into the cavity.

U. S. Patent Publication No. 2016/0066717, by Paul W. Schneider and published on Mar. 10, 2016, discloses a cushion device for the mounting of an electronic device, such as a laptop or a keyboard, etc., in the center of the cushion so that the operator can position the electronic device at a desired angle and location for operation of the electronic device.

The travel pillow shown in U. S Patent Publication No. 2017/0237272, by Alvaro Corona and published on Aug. 17, 2017, is formed as a simple curved device that encircles the neck of the user forming a pair of forwardly projecting arms that typically rest on the chest of the user. In one of the forwardly projecting arms, the pillow includes a charging station incorporated therein to provide a face available to the user in order to insert charging cords to charge electronic devices. This charging station is formed with a cylindrical housing that can be located at the end of one of the forwardly projecting arms to receive a detachable power bank that includes a fastener means that engages the housing to secure the power bank in the housing, leaving the face of the power bank to be accessible to the user for connecting charging cords. The power bank is, therefore, removable and replaceable with respect to the travel pillow.

It would be desirable to provide an improved travel pillow configuration in which is compatible with different devices to enhance the comfort in the operation of the travel pillow, as well as support various functions that enhance the entertainment and the utilization of the travel pillow.

SUMMARY OF THE INVENTION

It is an object of this invention to overcome the disadvantages of the prior art by providing a travel pillow that is configured to provide a comfortable operation and enhanced utilization for the user of the pillow while traveling.

It is an object of this invention to provide a charging station in the structure of the travel pillow to provide a charging capability that keeps electronic devices operable for an extended period of time while traveling.

It is a feature of this invention that the presence of a portable charging station within the travel pillow resolves the issue of passengers having their electronic devices, such as cell phones, become unusable during a flight due to not having an electric charge.

It is another feature of this invention that the travel pillow is formed with a head portion that is positioned behind the user's head during utilization to enhance the comfort of the traveler using the pillow.

It is an advantage of this invention that the head portion on the travel portion can be formed as an animal head for a pleasing aesthetic effect.

It is still another feature of this invention that the travel pillow incorporates an audio device into the structure of the pillow positioned to opposing sides of the head of the user to enable the user to hear sound from electronic devices used while traveling.

It is another advantage of this invention that the audio devices can be Bluetooth enabled to pair with a desired electronic device without requiring direct connection therebetween.

It is another advantage of this invention that the audio devices can be headphones, ear buds or a speaker carried on the head portion of the travel pillow.

It is yet another feature of this invention that the central portion of the body of the travel pillow can be formed to carry a removable instrument.

It is yet another advantage that this removable instrument can be formed with a lid that can hold an electronic device for convenient access thereto.

It is still another advantage of this invention that the removable device can be a snack bowl for which the lid closes the cavity of the snack bowl until removed from the central portion of the travel pillow.

It is still another feature of this invention that the travel pillow is formed with a pair of forwardly extending arms that incorporate a closing device to retain the removable instrument within a central opening formed in the travel pillow until the closure is opened.

It is a further advantage of this invention that the closure device can be a magnetic closure.

It is still a further advantage of this invention that the opening of the closure device and the removable instrument in the central opening of the travel pillow opens the travel pillow into a configuration that can be placed around the traveler's neck.

It is a further feature of this invention that the closure will engage the two opposing forwardly extending arms and wrap the travel pillow around the traveler's neck to enhance the comfort in the utilization of the travel pillow.

It is still another feature of this invention that the snack bowl can retain snacks therein for consumption at a desired time during travel by opening the lid and exposing the interior cavity of the bowl for access by the traveler.

It is still another object of this invention to provide a stress reliever extending from the end of one of the forwardly extending arms of the travel pillow.

It is another feature of this invention that the stress reliever is easily accessible when the travel pillow is positioned around the neck of the traveler.

It is another advantage of this invention that the stress reliever can be formed as a tail corresponding to the animal head portion of the travel pillow.

It is still another advantage that manipulation of the stress reliever can enhance the comfort and relieve anxiety of a nervous traveler.

It is yet another object of this invention to provide a travel pillow for use during travel, particularly in airplanes in which the travel pillow is durable, inexpensive to manufacture, carefree of maintenance, and simple and effective in use.

These and other objects, features and advantages are accomplished according to the instant invention by providing a travel pillow having an integral head portion that can be positioned behind the head of the traveler during use. The travel pillow incorporates a charging station in one of the forwardly extending arms and a stress reliever in the opposing forwardly extending arm. A Bluetooth™ audio system is included to pair with selected electronic devices to enhance the entertainment of the traveler. The pillow also includes a central opening corresponding to the location of the traveler's neck with the central opening receiving a removable snack bowl and lid held in place within the central opening by a closure device on the opposing arms of the travel pillow. The lid can be formed to receive an electronic device, such as a cell phone or a digital device generating sound received by the audio system. The head portion can be formed as an animal head with the stress reliever being the tail of the animal.

BRIEF DESCRIPTION OF THE DRAWINGS

The advantages of this invention will become apparent upon consideration of the following detailed disclosure of the invention, especially when taken in conjunction with the accompanying drawings wherein.

DETAILED DESCRIPTION OF THE PREFERRED EMBODIMENTS

Figure 1:
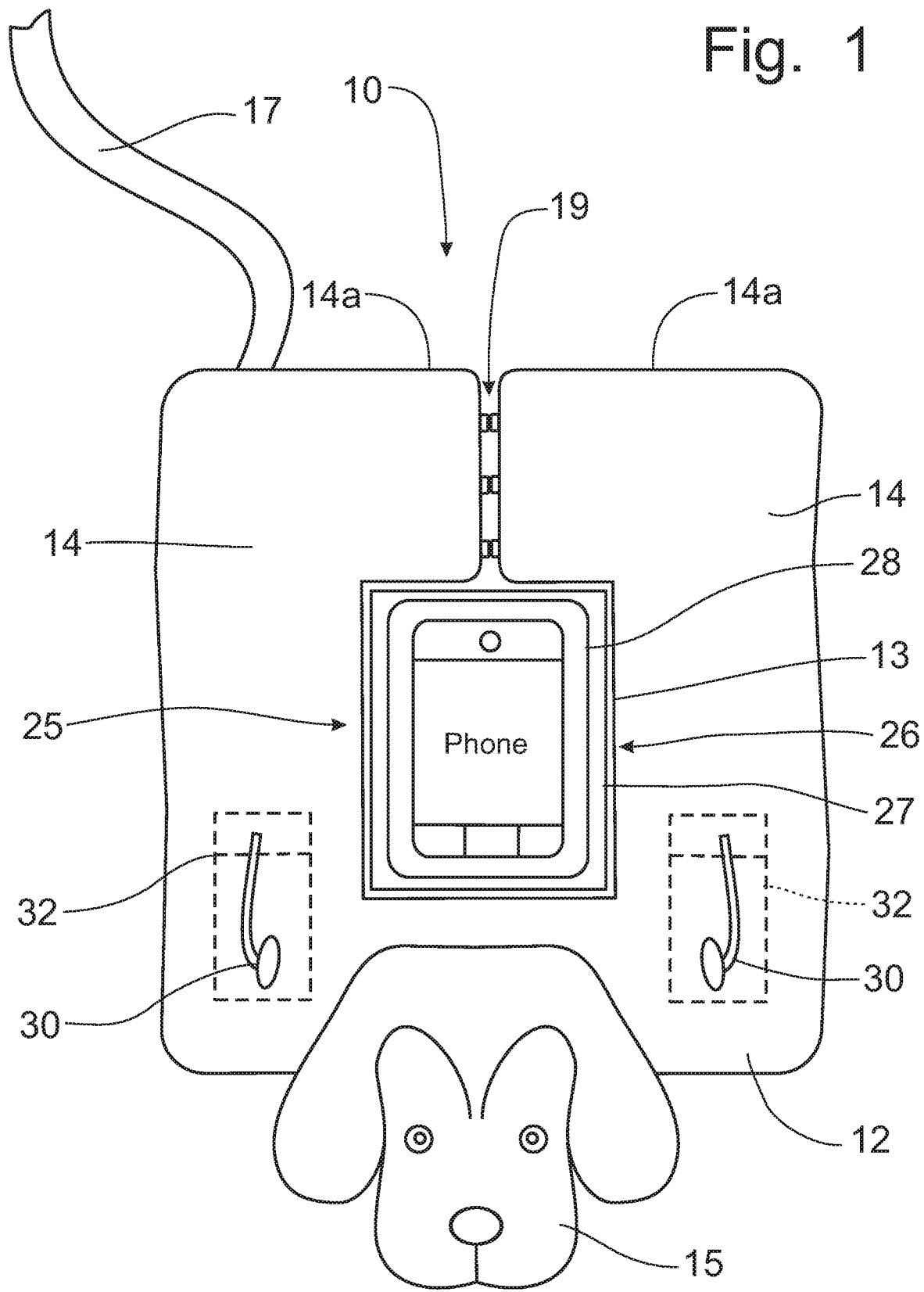
FIG. 1 is a top plan view of a travel pillow incorporating the principles of the instant invention, the travel pillow being depicted in a transport configuration with the snack bowl received within the central opening of the travel pillow.
Figure 2:
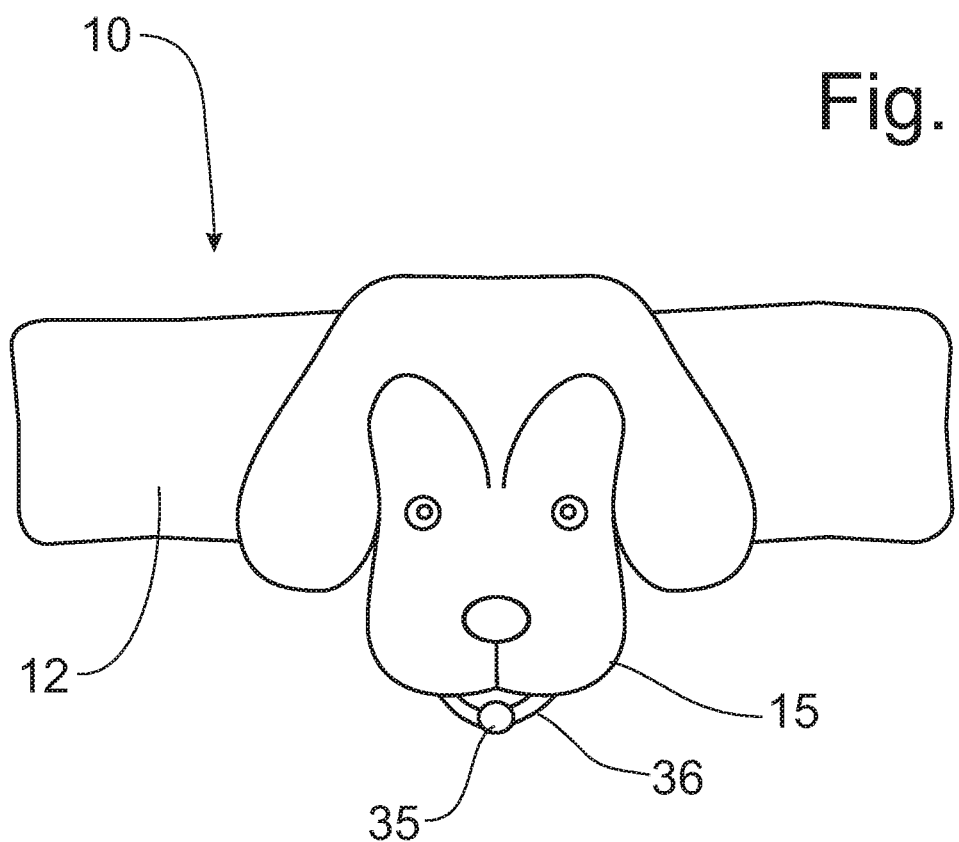
FIG. 2 is a rear elevational view of the travel shown in FIG. 1, looking at the head portion.

Referring now to FIGS. 1-5, a travel pillow incorporating the principles of the instant invention can best be seen. References to front and rear herein are determined by the normal use of the travel pillow and the orientation thereof with the person using the pillow. Accordingly, the rearward indication would be the portion of the travel pillow that is behind the traveler's neck when in use, and the forward indication would be in front of the face of the traveler. The travel pillow 10 includes a body portion 12 that is preferably generally shaped as a rectangular enclosure around a central, preferably rectangular central opening 13. One skilled in the art will recognize that the specific geometric shape of the travel pillow body portion 12 can be in many different configurations, including oval, or generally rectangular with rounded corners, etc. The central opening 13 is sized to accommodate the positioning of the travel pillow 10 around the neck of a traveler, as will be described in greater detail below.

The body portion 12 of the travel pillow 10 can be formed from polyurethane foam covered with a removable fabric cover preferably fabricated from a washable material that is comfortable to the touch and is hypo-allergenic. Other fillers for the body portion 12 would include memory foam, beads, microbeads, beanbag filler, foam, down feathers, polyester fiberfill, polyester pellets, etc. Preferably the fabric cover is shaped like the body portion 12 and is in one piece to facilitate installation of the filler into the fabric cover member. Clearly, loose filler material, such as beads, pellets and the like require an enclosure in the shape of the body portion 12 in order to contain the loose filler material while the cover member is removed for washing or replacement.

The body portion 12 also has a head portion 15 on the rearward side thereof. Preferably, the head portion 15 is in the form of an animal's head, like a puppy as shown in the drawings. One skilled in the art will recognize that the shape of the head portion 15 as an animal head is not the only configuration within the scope of this invention, as the function of the head portion 15 is to be positioned behind the head of the traveler when the travel pillow 10 is being utilized to enhance the comfort to the traveler in the use of the travel pillow 10. Maintaining the image of the travel pillow 10 as a comfort-inducing animal, the front portion of the travel pillow 10 would be provided with a stress reliever 17, preferably in the form of a "tail" corresponding to the type of animal reflected in the head portion 15. The stress reliever 17 can provide an anxious traveler with a "worry member" that can be twisted and worked with the traveler's hands to relieve stress.

The travel pillow 10 is shaped as an enclosure with the rearward part thereof having the head portion 15 mounted thereon and forming a bight for the enclosure configuration. From the bight of the travel pillow 10, a pair of forwardly extending arms 14 extend to the front of the travel pillow 10 and terminate in opposing ends 14a that typically rest on the traveler's chest when the travel pillow 10 is in use. The stress reliever 17 is attached to and extends from one of the ends 14a of the forwardly extending arms 14. Preferably, the ends 14a are shaped to turn toward each other and meet at a point corresponding to the center of the central opening 13.

Figure 3:
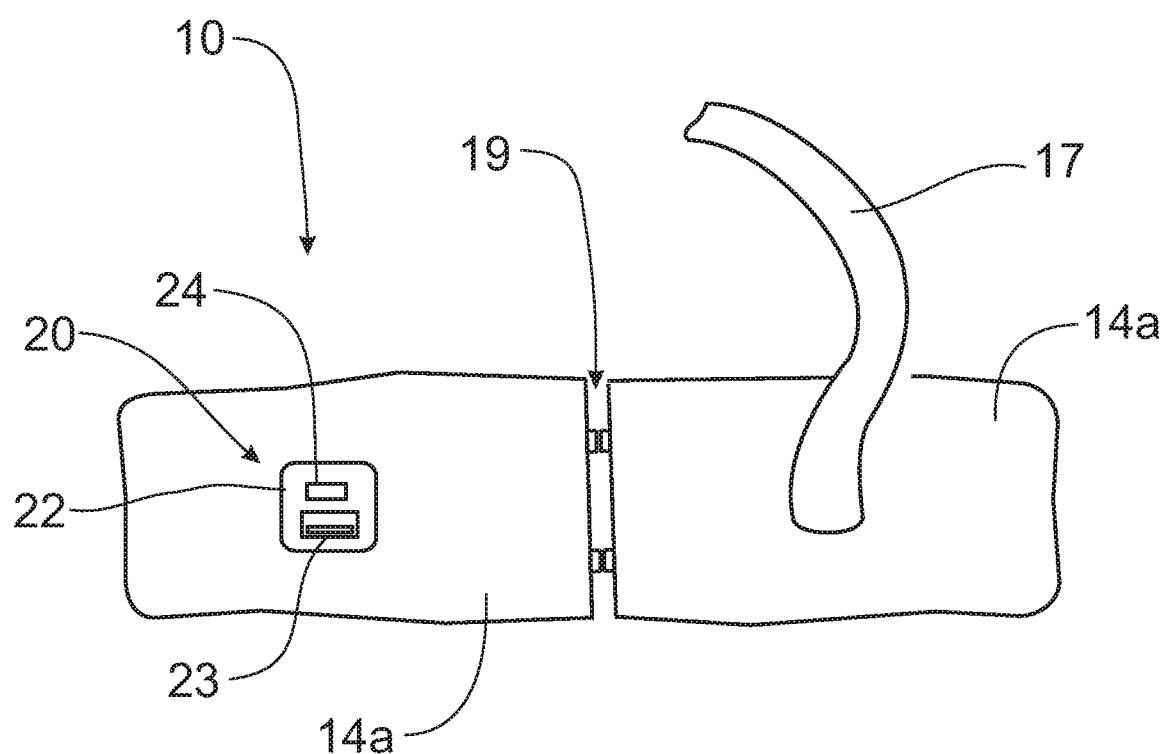
FIG. 3 is a front elevational view of the travel pillow shown in FIG. 1, the head portion being removed for purposes of clarity.
Figure 4:
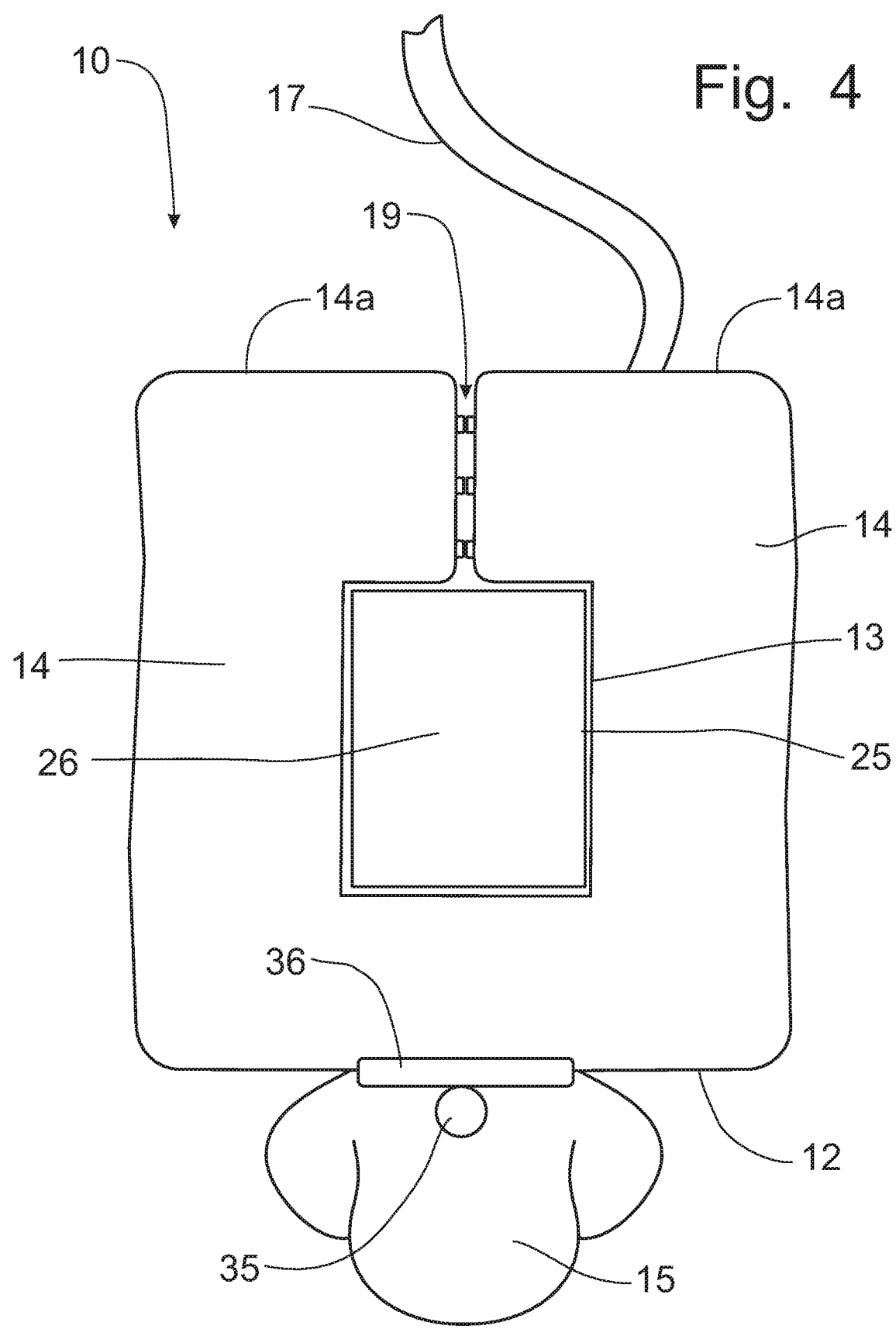
FIG. 4 is a bottom plan view of the travel pillow shown in FIG. 1.
Figure 5:
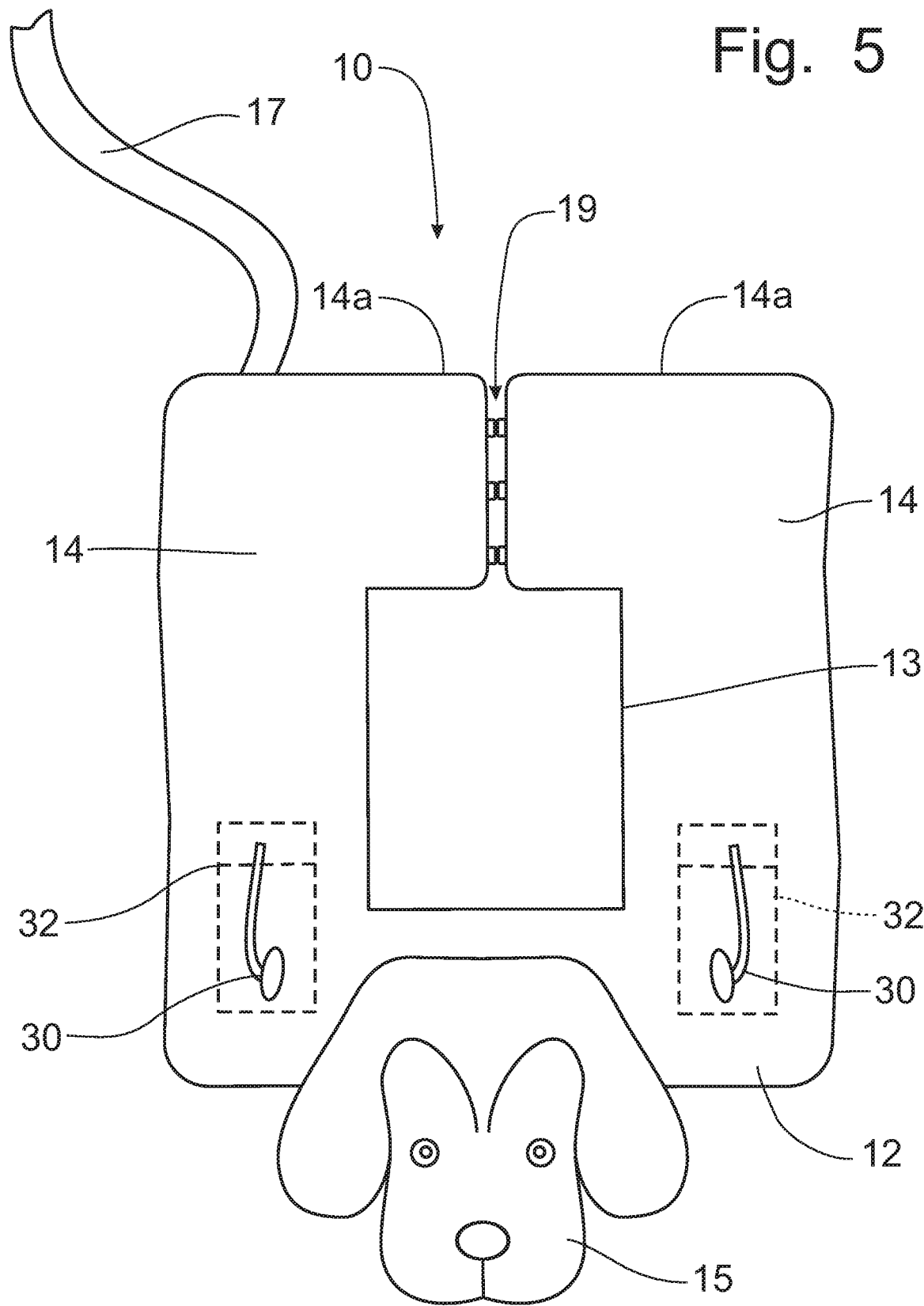
FIG. 5 is a top plan view of the travel pillow similar to that of FIG. 1, but with the snack bowl removed from the central opening to prepare the travel pillow of utilization.

As is best seen in FIG. 3, the end 14a of the forwardly extending arm 14 opposite to that of the stress reliever 17 includes a charging device 20 that is built into the end 14a of the corresponding arm 14. The charging device 20 exposes only the face 22 of the charging device 20 which exposes the USB port 23 and mini-USB port 24 for access by the traveler to keep electronic devices charged during the travel period. The charging device 20 includes a battery (not shown) that is retained within the body of the arm 14 and is capable of retaining an electrical charge that can be accessed through the ports 23, 24. Preferably, the charging device 20 is integrally built into the structure of the body portion 12 and is not removable therefrom. Re-charging the battery can be accomplished by plugging a charging cable (not shown) into one of the ports 23, 24 to provide a flow of electrical current from a supply, such as a house current, into the battery. Alternatively, the charging device 20 is secured to the end 14a by a fastening device (not shown) that can be unfastened to permit the removal of the charging device 20 for remote re-charging.

The body portion 12 can encircle a removable instrument 25 that is received within the central opening 13 and retained in place by a closure device 19 connecting together the two ends 14a of the forwardly extending arms 14 and capturing the removable instrument 25. The removable instrument 25 can be in the form of a snack bowl or tray 26 that is closed by a lid 27 to retain any snacks within the bowl 26 until the lid 27 is disengaged from the bowl or tray 26. Preferably, the removable instrument 25 would include a holder 28 for an electronic device, such as a cell phone, which can be incorporated into the lid 27. With the disengagement of the closure device 19, the two ends 14a can be separated and the instrument 25 removed to expose the central opening 13 for placement around the traveler's neck. The closure device 19 is preferably a magnetic closure or a hook and loop fastener that enable a secure connection for retention of the removable instrument 25, but is easy to disengage for removal of the instrument 25.

The travel pillow 10 also incorporates built-in audio features, preferably Bluetooth™ enabled to permit wireless connection to selected electronic devices. The audio features can include head phones 30 that are incorporated into the forwardly extending arms 14 near the bight of the body portion 12 to permit convenient access for the traveler when the travel pillow 10 is being utilized and positioned around the neck of the traveler. The head phones 30 can be extracted from the body portion 12 and are preferably hidden within a storage pocket 32 on opposing arms 14. One skilled in the art will recognize that these Bluetooth™ enabled devices can include ear buds of various configurations and other audio devices. One such alternative is a Bluetooth™ enabled speaker 35 which can be located in various places convenient to access by the traveler, including locating the speaker in the head portion 15. As an example, when the head portion 15 is formed as the head of a puppy, the speaker 35 can be incorporated into a "collar" 36 for the puppy head, as is represented schematically in FIGS. 2 and 4.

In operation, the traveler carries the travel pillow 10 on board the airplane and opens the closure device 19 to remove the instrument 25 captured within the central opening 13 of the body portion 12. The travel pillow 10 can then be positioned for the comfort of the traveler by placing the bight of the body portion 12 behind the traveler's neck with the forwardly extending arms 14 passing on opposing sides of the traveler's neck and terminating below or in front of the traveler's face. The head portion 15 can be positioned upwardly from the bight of the body portion 12 so that the head portion 15 is located behind the traveler's head to provide comfort to the traveler and to separate the traveler's head from the head rest or top of the seat in which the traveler is seated. If the removed instrument 25 is a snack bowl 26, the lid 27 can be opened at any appropriate time to allow the traveler to partake of the snacks stored therein.

The cell phone, or other electronic device, can be removed from the enclosure or holder 28 incorporated into the lid 27 and utilized as desired and as appropriate by the traveler. If audio transmission is desired, the Bluetooth™ enabled head phones 30 or other audio devices, such as the Bluetooth™ enabled speaker 35 can be activated and allow the traveler to privately, or semi-privately, hear the audio output of the electronic device being utilized. The electronic device can be a digital player for movies or the like that transmit the audio via Bluetooth™ to the audio devices 30, 35. Once the flight is completed, or the use of the travel pillow 10 is no longer desired, the traveler can re-assemble the components of the travel pillow 10 by re-positioning the audio devices 30, and by re-opening the closure device 19 and placement of the instrument 25 back into the central opening 13 for capture therein by the re-engagement of the closure device 19.

It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention.

Having thus described the invention, what is claimed is:
1. A travel pillow for use by a human traveler having a head and neck, comprising:
 a body portion formed generally in a U-shaped configuration defining a central opening between two opposing, forwardly extending arms meeting to form a bight positionable behind the traveler's neck when the travel pillow is being utilized;
 a head portion attached to the bight of the body portion and extending outwardly therefrom, said head portion being positionable behind the head of the traveler when the travel pillow is being utilized;
 a removable instrument captured between said forwardly extending arms within said central opening, said removable instrument requiring removal from said body portion before said travel pillow can be engaged around the neck of said human traveler, said ends of said two forwardly extending arms including a closure device that connects the two forwardly extending arms together at said ends in a manner to capture said removable instrument within said central opening, said removable instrument being a snack container that is closable with a lid to secure food items within the snack container, said lid incorporating a holder member for receiving and transporting an electronic device; and
 a charging device having a face provided with appropriate charging connectors to deliver an electrical charge to electronic devices connected thereto, said charging device is positioned at an end of one of said two forwardly extending arms of said body portion.

2. The travel pillow of claim 1 wherein an end of a second of said two forwardly extending arms has attached thereto an elongated stress reliever.

3. The travel pillow of claim 2 wherein said head portion is formed in the shape of an animal's head and said stress reliever is formed in the shape of an animal's tail corresponding to said animal's head.

4. The travel pillow of claim 1 wherein said closure device is a magnetic closure.

5. The travel pillow of claim 1 further comprising audio devices stored on said body portion proximate to said bight for convenient access by the human traveler.

6. The travel pillow of claim 5 wherein said audio devices are head phones or ear buds stored within a pocket on said forwardly extending arms.

7. The travel pillow of claim 5 wherein said audio devices include a wireless speaker that receives audio transmissions from a selected electronic device.

8. A travel pillow comprising:
a body portion formed generally in a U-shaped configuration defining a central opening between two opposing, forwardly extending arms meeting rearwardly to form a bight in said body portion;
a head portion attached to the bight of the body portion and extending outwardly therefrom;
a snack container that is closable with a lid to secure food items within the snack container being captured within said central opening between said forwardly extending arms within said central opening such that said snack container requires removal before said travel pillow can be utilized;
each of said two forwardly extending arms having a forwardly positioned end that includes a closure device that connects the two forwardly extending arms together at said ends in a manner to capture said removable instrument within said central opening; and
a charging device having a face provided with appropriate charging connectors to deliver an electrical charge to electronic devices connected thereto, said charging device being positioned at the forwardly positioned end of one of said two forwardly extending arms of said body portion, the forwardly positioned end of a second of said two forwardly extending arms having an elongated stress reliever attached thereto.

9. The travel pillow of claim 8 wherein said head portion is formed in the shape of an animal's head and said stress reliever is formed in the shape of an animal's tail corresponding to said animal's head.

10. The travel pillow of claim 8 wherein said closure device is a magnetic closure, said snack container being closable with a lid to secure food items within the snack container.

11. The travel pillow of claim 8 further comprising audio devices stored on said body portion proximate to said bight for convenient access.

12. The travel pillow of claim 11 wherein said audio devices are one or more of head phones, ear buds and a wireless speaker that receive audio transmissions from a selected electronic device.

13. A travel pillow for use by a human traveler having a head and neck, comprising:
a body portion formed generally in a U-shaped configuration defining a central opening between two opposing, forwardly extending arms meeting to form a bight positionable behind the traveler's neck when the travel pillow is being utilized;
a head portion attached to the bight of the body portion and extending outwardly therefrom, said head portion being formed in the shape of an animal's head and being positionable behind the head of the traveler when the travel pillow is being utilized;
a charging device having a face provided with appropriate charging connectors to deliver an electrical charge to electronic devices connected thereto, said charging device being positioned at an end of one of said two forwardly extending arms of said body portion;
a removable instrument captured between said forwardly extending arms within said central opening such that said removable instrument requires removal from said body portion before said travel pillow can be engaged around the neck of said human traveler, each of said two forwardly extending arms having a forwardly positioned end that includes a closure device that connects the two forwardly extending arms together at said ends in a manner to capture said removable instrument within said central opening; and
audio devices incorporated into said body portion including one or more of head phones, ear buds and a wireless speaker that receive audio transmissions from a selected electronic device.

14. The travel pillow of claim 13 wherein an end of a second of said two forwardly extending arms has attached thereto an elongated stress reliever, said stress reliever being formed in the shape of an animal's tail corresponding to said animal's head.

15. The travel pillow of claim 13 wherein said removable instrument is a snack container that is closable with a lid to secure food items within the snack container, said lid incorporating a holder member for receiving and transporting an electronic device.

* * * * *